Jan. 1, 1952         A. BIRNBAUM         2,581,164

THERMAL TIME DELAY DEVICE FOR JETTISONABLE PROPULSION MOTORS

Filed July 3, 1948

INVENTOR.
ARNOLD BIRNBAUM

BY Virgil F. Davco

ATTORNEY

Patented Jan. 1, 1952

2,581,164

UNITED STATES PATENT OFFICE 2,581,164

THERMAL TIME DELAY DEVICE FOR JETTISONABLE PROPULSION MOTORS

Arnold Birnbaum, Irvington, N. J., assignor to The M. W. Kellogg Co., Jersey City, N. J., a corporation of Delaware Application July 3, 1948, Serial No. 36,843

3 Claims. (Cl. 244—63)

This invention relates to time delay devices and specifically to time delay devices in which accurate time delays are obtained by the use of heat conducting paths of predetermined thermal conductivity.

Mechanical and electrical timing devices are commonly used for obtaining time delays but these devices are complicated, expensive, and their accuracy is dependent on the efficiency of manufacture of their component parts.

It is therefore a primary object of the present invention to provide a novel time delay device which does not include mechanical or electrical time measuring elements or other moving parts and which accurately determine the time delay by means of a thermally conducting element of chosen material and length.

It is also a principal object of the present invention to provide a novel arrangement for jettisoning a booster device from the main body of a vehicle adapted to be propelled after a predetermined time interval of operation of the booster device.

Another object of the present invention is to provide a novel means for releasably mounting one body to another and actuating a separation of the two bodies after a predetermined time delay by heat conduction through a heat conducting path connecting a source of heat and the releasable mounting means.

Still another object of the present invention is to provide a heat conducting path of predetermined thermal characteristics and accurately provide a time delay wherein the duration of said time delay is determined by the selection of material and length of material of said heat conducting path.

These and other objects, features and advantages of the present invention will be apparent from the following description, drawings and claims of the presently preferred form of the present invention in which:

The present invention is of general application and may be used wherever accurate time delays are required. A thermal path such as a rod heated at one end will conduct heat from the heated end to the unheated end at a rate which is determined by the temperature at the heated end, a predetermined temperature at the unheated end, the material of the rod and the physical properties of the material; consequently the time required for the end of the thermal path most remote from the source of heat to attain a predetermined temperature is a function of the length of the thermal path and a means is available for the achievement of variations in time delays, i. e., the length of time it takes to raise the temperature of the unheated end to a predetermined degree, by accurately controlling the length of the thermally conducting path once the material of the path has been chosen. For a given time delay, the lengths of material used as thermal time delay devices will vary according to the physical properties of the different materials. A thermal path of copper will be of different length than thermal path of glass to achieve the same time delay. A thermal path of glass and copper of the same length will naturally produce different time delays for the unheated ends of the rods to attain the same predetermined temperature. While the device of the present invention utilizes a rod of material to achieve a time delay, it is needless to describe in detail that a temperature lag accompanies the time delay. The temperature gradient from the heated end of the thermal path towards the unheated end can be determined with unquestionable accuracy once the material and length of material have been selected, the temperature of the heat source measured, and the predetermined temperature at the unheated end fixed. For the purpose of this disclosure, the present inventions will be described in connection with an airborne missile provided with a booster device that is to be jettisoned after a predetermined delay.

In order to launch airborne missiles designed for speeds above the sonic range it is necessary that the missile be given an exceedingly high acceleration rate at launching in order that they be brought up into and through the sonic speed range as rapidly as possible. It is impractical to use the main propelling units to impart rapid accelerations of the missile up to the sonic range and still propel the missile at speeds above the sonic range for any period of time because of the great quantities of fuel which would have to be provided. Rather than devise a propelling unit to accomplish this objective, it has become standard practice to attach a booster device capable of imparting high accelerations for a short period of time to the main body of the missile and to jettison the booster device and put into operation the main propelling units of the missile once it has passed through the sonic speed range.

Figure 1:
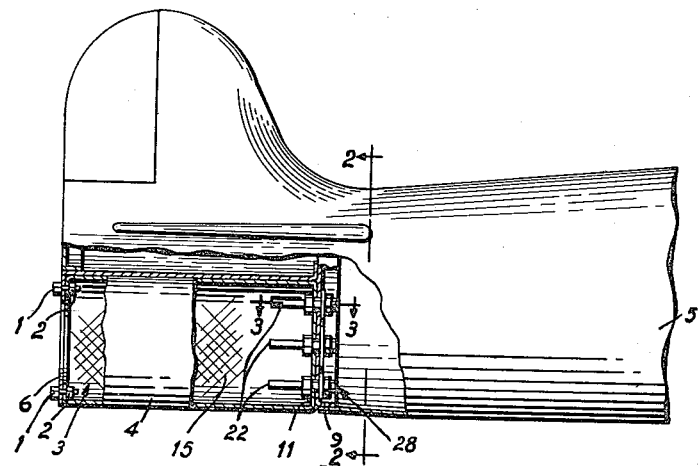
Fig. 1 is a fragmentary view, with parts broken away, of an application of the novel time relay device of the present invention.
Figure 2:
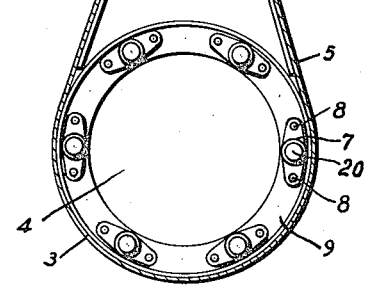
Fig. 2 is a section taken on line 2—2 of Fig. 1 and looking in the direction of the arrows.
Figure 3:
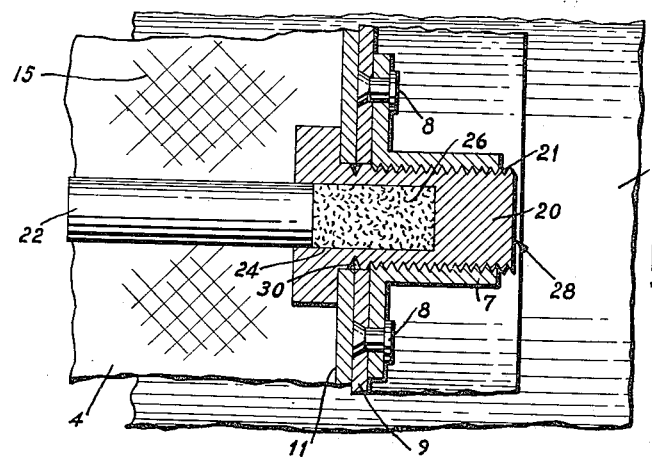
Fig. 3 is a section taken on line 3—3 of Fig. 1 and looking in the direction of the arrows.

Referring now to the drawings, Fig. 1 is a fragmentary view partly in section of an airborne projectile 5 which may be of any desired shape since it does not constitute a part of this invention, having attached thereto, a booster device 3, loaded with a heat generating and gas producing booster charge 4. The booster device 3 is provided with an end plate 11 for the purpose of attaching said booster device 3 to a flange 9 forming a part of the airborne projectile 5. The flange 9 and plate 11 are secured together by a plurality of releasable securing means 28 as illustrated in Fig. 1; the releasable securing means 28, shown in detail in Fig. 3, and which comprises a bolt 20 having a hole or hollow section 24 in its head and provided with threads 21 on its opposite end and adapted to be threaded into the internal threads of the anchor nuts 7 which are secured to the flange 9 by means of rivets 8. A groove or weakened section 30 is provided in the shank of the bolt 20 and encircles the hole or hollowed sections 24. An explosive charge 26 is located in the hollowed sections 24 and is adapted upon being detonated to rupture or sever bolt 20 along weakened section or groove 30.

A plurality of bolts 1 and nuts 2 are employed to keep the booster charge 4, whose charge material has been symbolically represented by the cross hatching 15, in position. Bolts 1 and nuts 2 secure the annular collar 6 to a flange on the body of the booster device 3.

A heat conducting path 22, comprising a rod having predetermined thermal characteristics, has one of its ends fixedly mounted in the hole or hollowed section 24 and in contact with the explosive charge 26. End plate 11 is so located with respect to the booster charge 4 that when the releasable securing means 28 are in position holding flange 9 and plate 11 together, the free end of the heat conducting path or rod 22 is in contact with the booster charge 4 and provides a heat path from said booster charge 4 to the explosive charge 26. In order to launch the missile, a spark, flame or any of the well known igniting means may be used to start the booster charge 4 burning and thereby produce the heat producing gases of combustion which in turn supply the initial thrust required to launch the missile with a high acceleration for a short period of time. The end of the heat path 22 in contact with the booster charge 4 will conduct heat from the booster charge 4 to the explosive charge 26 in the releasable securing means 28. Heat is transmitted along the path or rod 22 at a rate which is determined by the thermal conductivity characteristics thereof. The explosive charge 26 in the releasable securing means 28 is exploded when heat path 22 has conducted sufficient heat to bring its end which is in contact with the explosive charge 26 up to the detonation temperature of said explosive charge 26. The detonation of explosive charge 26 will cause the releasable securing means 28 to fracture along the weakened section 30 thereby disconnecting the booster device 3 from the missile 5.

Inasmuch as there is a temperature gradient along the length of the rod or heat path 22, the end thereof, that is in contact with explosive charge 26, will be at a lower temperature than the end in contact with ignited booster charge 4. The length of heat path or rod 22 is such that explosive charge 26 will be detonated, thereby, to jettison booster device 3 at the time that booster charge 4 is substantially all consumed.

Figure 4:
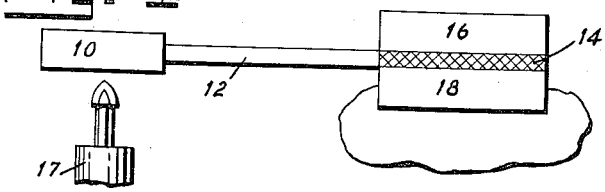
Fig. 4 is a diagrammatic view illustrating a modification of the present invention.

In many instances in the preparation of basic raw materials, it is necessary that certain reactions take place and temperature conditions held for a predetermined time before the next step in the process is carried out. Some processes demand that a number of these delayed reactions take place before the desired end products are obtained. The time delay device of the invention is capable of fulfilling these needs. Fig. 4 illustrates a modification of the present invention capable of fulfilling these requirements. A heat reservoir 10, being heated by a heat generating device, as for example, a flame 17 or a furnace, electrical heating element, exothermic chemical reaction, or any other heat producing means is in contact with one end of a rod or heat conducting path 12, as for example, a rod of metal, glass, plastic or any other conductor of heat whose thermal conductivity properties are known or may be calculated. The other end of rod 12 is in contact with a releasable securing means 14 releasably securing body 16 to body 18. Releasable securing means 14 may be a material such as a wax, glue, thermo-plastic bond or any other similar material capable of changing its state or form or condition upon the attainment of a predetermined temperature. The heat from the heat reservoir 10 is conducted from reservoir 10 along rod 12, to the releasable securing means 14. After a predetermined time delay which is determined by the length and material of rod 12, the releasable securing means 14 will reach a predetermined temperature which will cause the thermo-plastic material 14 to release body 16 from body 18.

The behavior of heat paths such as 12 as time delay devices may be readily determined and the time delays readily calculated by the use of the basic laws of heat conduction through a solid.

As many changes can be made in the systems described and various widely different applications of the present invention made without deviating from the fundamentals of the present invention, the material set forth in the foregoing description and in the following claims is intended to be illustrative and not intended to be interpreted in a limiting sense.

What is claimed is:

1. A separable, auxiliary propelling device for a body adapted to be propelled comprising a booster charge, means for attaching said device to said body, said means consisting of a plurality of bolts with explosive filled heads adapted to detonate and fracture said bolts, heat conducting members having one end in contact with said explosive and the other end projecting a predetermined distance within said booster charge, said distance being determined by the thermal characteristics of said members through which heat is conducted until predetermined temperatures are reached for detonation of said explosive at the same time that said booster charge has been substantially completely consumed.

2. In a booster propelling device for a body adapted to be propelled, a booster charge, rupturable attaching means connecting said device to said body and adapted to function upon substantial completion of the combustion of said booster charge and comprising a plurality of bolts with weakened body sections and with head ends filled with explosive, and heat conducting members contacting said explosive and projecting a distance into said booster charge determined by the combustion temperature of said booster charge, the temperature for detonation of said explosive and the thermal characteristics of said members, resulting in a time delay in heat conduction, permitting substantially complete combustion of said booster charge, until temperatures are reached causing detonation of said explosive, rupture of said attaching means, and separation of said device from said body.

3. In combination with a body adapted to be propelled, a booster propelling device containing a booster charge and adapted to be jettisoned upon consumption of said charge, attaching means releasably connecting said device to said body, said means each having a weakened body section and an explosive containing head portion, heat conducting means in fixed contact with said explosive in said head portions projecting within said booster charge, the length of each of said last mentioned means being determined by the temperature of the heated end and the temperature required at the other end for detonation of said explosive in said head portions, substantially coincident with completion of combustion of said booster charge, causing fracture of said attaching means at said weakened body sections.

ARNOLD BIRNBAUM.

REFERENCES CITED

The following references are of record in the file of this patent:

UNITED STATES PATENTS

| Number | Name | Date |
| --- | --- | --- |
| 1,672,163 | Krammer | June 5, 1928 |
| 2,083,054 | Cline | June 8, 1937 |
| 2,103,014 | Palmieri | Dec. 21, 1937 |
| 2,387,742 | Burrows | Oct. 30, 1945 |
| 2,398,391 | Orkin | Apr. 16, 1946 |